United States Patent Office 3,420,375
Patented Jan. 7, 1969

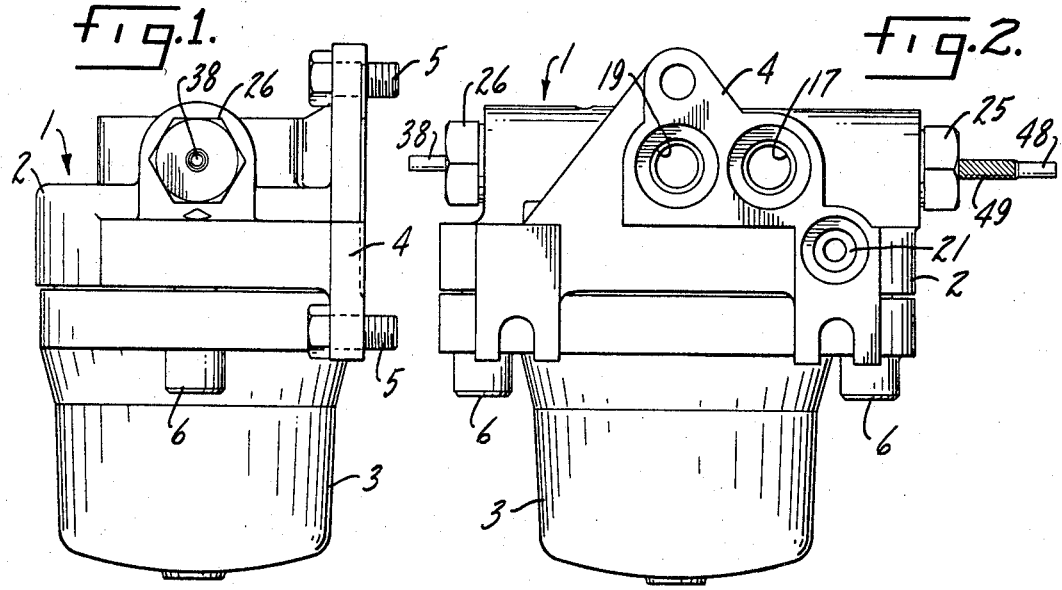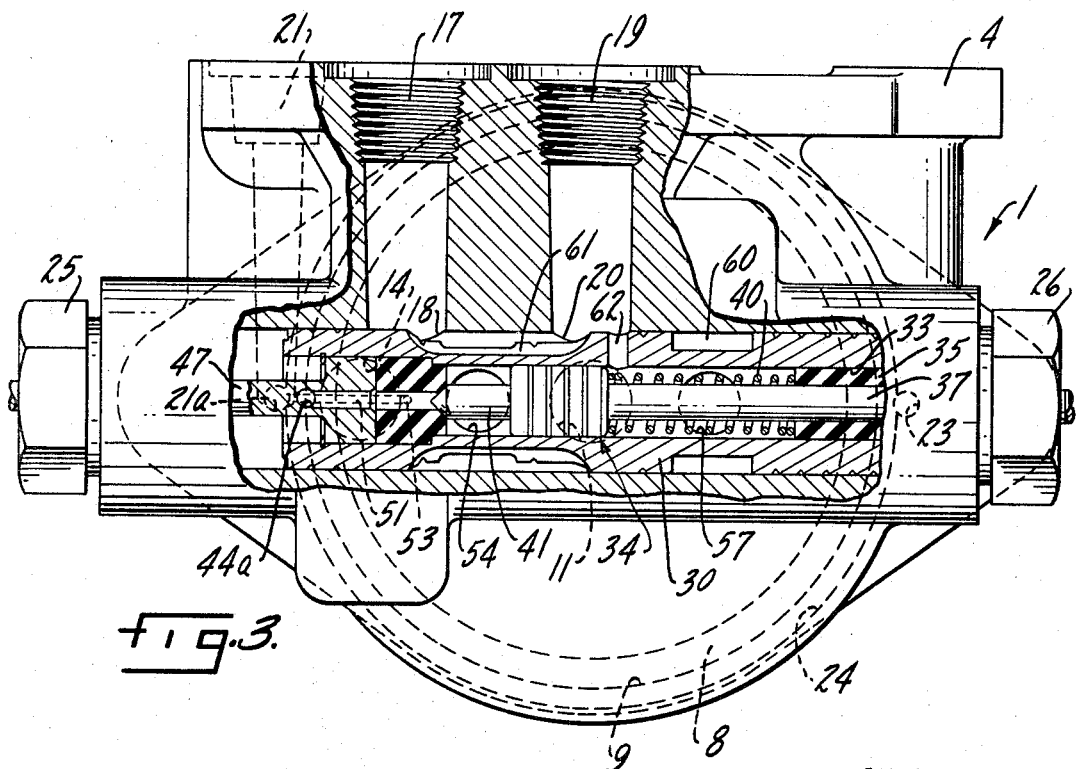

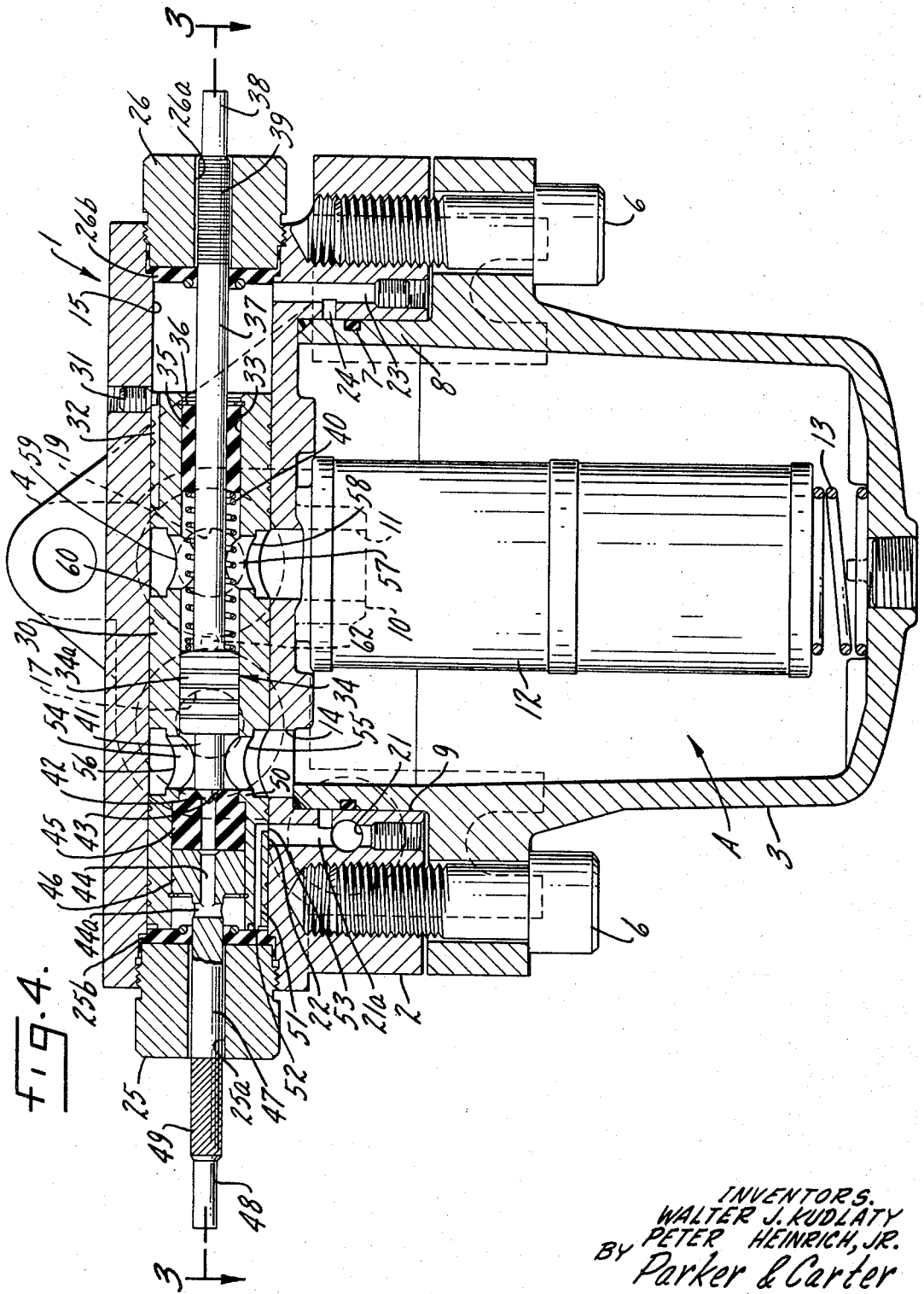

3,420,375
FILTER WITH AUTOMATIC BYPASS-SHUTOFF
Walter J. Kudlaty, Elmhurst, and Peter Heinrich, Jr., Chicago, Ill., assignors to Marvel Engineering Company, Chicago, Ill., a corporation of Illinois
Filed Mar. 21, 1966, Ser. No. 538,152
U.S. Cl. 210—90       13 Claims
Int. Cl. B01d 27/10; B01d 35/14

This invention relates to filters and has particular relation to a filter assembly including automatic bypass-shutoff means.

One purpose of the invention is to provide a filter assembly having means automatically responsive to filter clogging to create a bypass of the filter element.

Another purpose is to provide a filter assembly having automatic means responsive to filter clogging to divorce a filter chamber from a flow of fluid.

Another purpose is to provide a filter assembly including means operable by the fluid to be filtered to bypass a filter chamber in response to clogging therein.

Another purpose is to provide a filter assembly including means operable by the fluid to be filtered to shut off a filter assembly from the flow of said fluid in automatic response to clogging in said filter chamber.

Another purpose is to provide a filter assembly having manually resettable automatic bypass-shutoff means.

Another purpose is to provide an automatic bypass-shutoff means including an automatic signal mechanism responsive to clogging of a filter chamber in said assembly.

Another purpose is to provide a filter assembly including automatic bypass, shutoff and drain means.

Another purpose is to provide a filter assembly including automatic bypass-shutoff means of maximum simplicity and minimum cost in manufacture.

Another purpose is to provide a filter assembly including a head, a separable filter housing and means for automatically directing fluid within said head and housing in response to the conditions within said filter housing.

Another purpose is to provide a filter assembly having a bypass-shutoff valve, a pilot valve, a pilot valve and means for automatically opening and resetting said pilot valve in response to fluid pressure differentials in said assembly.

Other purposes will appear from time to time during the course of the specification and claims.

The invention is illustrated more or less diagrammatically in the accompanying drawings, wherein:

FIGURE 1 is an end elevation;
FIGURE 2 is a side elevation;
FIGURE 3 is a top view taken along the line 3—3 of FIGURE 4 and showing parts in one position; and
FIGURE 4 is a side view in cross section and showing the parts in another position.

Like parts are indicated by like numerals throughout the specification and drawings.

Referring to the drawings, a filter housing, indicated generally by the numeral 1, consists primarily of a filter head 2 and a filter chamber housing portion 3. The head 2 includes a suitable mounting plate portion 4 with provisions for suitable fasteners 5.

The housing portion 3 is removably secured to the head by suitable fasteners, such as those shown at 6. A seal 7 is carried by an extension 8 on portion 3, which fits within a recess 9 in head 2. The head 2 includes a boss 10 extending axially within recess 9, substantially centrally thereof and defining a passage 11. Within housing portion 3 and the filter chamber A, defined thereby, is a filter element 12, one end of which surrounds and engages boss 10, the area within filter element 12 thus communicating with passage 11. Yielding means 13 engages the bottom wall of housing portion 3 within chamber A and the filter element 12 to urge the same toward head 2.

Head 2 includes a passage 14 communicating with chamber A and passages 11, 14 communicate at longitudinally spaced points with a laterally disposed bore 15 formed in head 2. A fluid pressure inlet passage 17 is formed in head 2 and communicates with bore 15, as indicated at 18. A fluid pressure outlet passage 19 is formed in head 2 and communicates with bore 15, at a point spaced from the point 18, as indicated at 20.

A drain outlet passage 21 is formed in head 2 and communicates with bore 15 through branch passage 21a, as indicated at 22. A second drain communicating passage 23 is formed in head 2 and communicates with branch passage 21a through an annular groove 24 formed in the circumferential wall of recess 9.

The bore 15 is shown as extending entirely through the head 2 in perpendicular relationship to the axis of housing portion 3, filter element 12 and boss 10, the ends of bore 15 being closed by caps 25, 26 which in turn have axial passages 25a, 26a formed respectively therein.

A spool valve 30 is freely slidable within bore 15, having portions of its external wall in sliding contact with the inner wall of bore 15. A key 31 is carried by head 2 and rides in slot 32 formed in the external wall of spool 30. Spool 30 has an axial bore 33 extending therethrough. A pilot or control valve 34 includes a piston portion 34a slidable within an intermediate portion of bore 33. A sleeve 35 is positioned in bore 33 at one end thereof and held therein by suitable means such as that indicated at 36. An indicator rod 37 is secured to piston 34a and extends axially through bore 33 and through sleeve 35. Rod 37 extends through seal 26b and through passage 26a in cap 26 and externally thereof as indicated at 38. Rod 37 includes an indicia portion 39 which may, for example, be colored red. A yielding means, such as spring 40, is seated in bore 33 and has its opposite ends engaging sleeve 35 and piston 34a to urge piston 34a away from sleeve 35.

Piston 34a carries a valve extension 41 having a valve face 42 positioned for seating on a valve seat 43 in response to the urging of spring 40. An axial passage 44 is closed by valve portion 41 and extends through packing 45 and a plug 46 for communication, through branch passage 44a, with the area at the end of bore 15 opposite that adjacent sleeve 35, for example. Secured to plug 46 and extending through a seal 25b and passage 25a of cap 25 is a second indicating rod 47 having an end portion 48 and an intermediate indicia-bearing portion 49 which may, for example, be colored green. An inwardly extending, offset flange 50 retains packing 45 and plug 46 against movement within spool 30.

Spool 30 includes a longitudinally extending drain and discharge pasage means 51 extending through an end face of spool 30 adjacent plug 46 as indicated at 52 and continuing laterally through the wall of spool 30 as branch outlet pasage 53. A lateral passage 54 extends through spool 30 between piston 34 and packing 45, communicating at its opposite ends with bore 15 as indicated at 55, 56. A second passage 57 similarly extends laterally through spool 30, in spaced relation with lateral passage 54 thereon, the pasage 57 communicating at its opposite ends with bore 15 as indicated at 58, 59 and with bore 33 behind piston 34a. It will be observed that passages 54, 57 are spaced apart in spool 30 the same distance as passages 14, 11 in head 2 whereby, as may be best seen in FIGURE 4, passage 54 may communicate with filter chamber A through passage 14 and pasage 57 may communicate with the area within filter element 12 through passage 11 when the spool 30 is in the normal filtering position indicated, for example, in FIGURE 4. It will be further observed that inlet and outlet passages 17, 19 have their communicating points 18, 20 spaced apart the same distance whereby inlet pasage 17 may communicate with filter chamber A through passages 54, 14 and outlet passage 19 may communicate with the area within filter element 12 through passages 57, 11 when the spool 30 is in said position.

As may be best seen in FIGURE 3, a recess 60 is formed in spool 30 adjacent passage 57. The external wall of spool 30 has grooved or recessed portion 61 formed therein and extending longitudinally thereof for direct communication of inlet passage 17 with outlet passage 19 in head 2 when the spool 30 is in the bypass-shutoff position shown in FIGURE 3, the portion 61 being of sufficient linear extension to bridge points 18, 20. As seen also in FIGURE 3, a branch passage 62 extends laterally inwardly from the side wall of spool 30 and communicates with the bore 33 in spool 30 on the opposite side of piston 34a from valve portion 41. When the spool is in the position shown in FIGURE 3, branch passage 62 communicates said area in bore 33 with the outlet passage 19.

The use and operation of the invention are as follows:

FIGURE 4 illustrates the asembly of the invention in its normal operating configuration. With the spool 30 in the position shown in FIGURE 4, or in the left-hand portion of bore 15, as the parts are shown in FIGURE 4, fluid pressure entering inlet 17 flows through passages 54, 14 into filter chamber A. Thence said fluid flows through filter element 12. The fluid thus filtered then flows hthrough passages 11, 57 and outlet passage 19 for delivery to the desired point. With the parts in said position, the indicator rod 47 is extending outwardly of head 2 to expose the indicia portion 49 to indicate to the observer that the filter is in proper operating condition. Hence the suggested green color for portion 49. The indicia portion 39 is retained within plug 26 and is thus invisible to the observer. In the normal operating position illustrated in FIGURE 4, the fluid pressures on the opposite sides of piston 34a are within such predetermined relationnship that yielding means 40 is effective to retain valve face 42 on seat 43 and thus to preclude flow of fluid through passage 44 or into bore 15 at the adjacent end of spool 30 and the parts will remain in the position shown.

Should filter element 12 become clogged or contaminated beyond a predetermined desirable point, however, the pressure differential between the pressure in passage 54, i.e. on one side of piston 34a, and the pressure in passage 57 on the opposite side of piston 34, becomes sufficiently great and the piston 34 will move, in response to the greater pressure in passage 54, against the action of yielding means 40 and valve face 42 will move off seat 43. Thereupon fluid pressure will pass through passage 44 and branch passages 44a into the area between seal 25b and plug 46 secured to spool 30. It will be noted that spool 30 is substantially freely slidable in bore 15 and that no forces are exerted on spool 30 to retain the same in the position shown in FIGURE 4. Hence the above-described presentation of pressure at one end thereof, or at the left-hand portion, as the parts are shown in FIGURE 4, produces a movement of spool 30 within bore 15 to the right as the parts are shown in FIGURE 4. Said movement of spool 30 seals passages 14 and 11 which are covered over by opposed portions of the spool 30 and thus shuts off the flow of fluid into filter chamber A and isolates housing 3 from head 2. At the same time, said movement of spool 30, into the position shown in FIGURE 3, for example, moves the reduced or recessed portion 61 into position to communicate fluid pressure inlet 17 directly with fluid pressure outlet 19, thus bypassing the filter chamber A and filter element 12. With the spool in said position, branch passage 62 communicates the area behind piston 34a with said fluid under pressure in outlet passage 19. With the pressures thus substantially equalized on opposite sides of the piston 34a, spring 40 is effective to return valve face 42 into seating engagement with valve seat 43, thus closing passage 44. With the spool in the bypass-shutoff position of FIGURE 3, the indicia portion 39 is exposed to view, indicating that the filter is not operating and the indicia portion 49 is rendered invisible, being withdrawn into plug 25. It will be understood that suitable machine-shutoff means (not shown), such as appropriate electrical switch elements for example, may, if desired, be positioned in alignment with rod portion 38 for actuation thereby when the spool 30 moves into the position shown in FIGURE 3 to shut down the operation of a machine dependent upon the filtered fluid, as well as to actuate additional visual or audible signal means.

Since spool 30 is freely slidable within bore 15, in metal-to-metal contact therewith, leakage of fluid into bore 15 may occur. Hence drain pasages 21a, 23, groove 24 and outlet drain passage 21 are provided. Outlet 53 of discharge passage 51 communicates with drain passage 21a when spool valve 30 is in the normal position shown in FIGURE 4.

As the spool valve 30 is moved to the position shown in FIGURE 3, passage 51 places the area of bore 15 to the left of spool 30, as the parts are shown in the drawings, in communication with passage 14, the outlet branch of passage 51 moving across passage 14 as the spool moves toward said position. Thus the fluid pressure present to the left of spool 30 is drained or dissipated into chamber A, and when spool 30 reaches the position shown in FIGURE 3 no fluid will be trapped to serve as an obstacle to the return of spool 30. Branch 53 is closed against dripping when the spool has reached its full travel as shown in FIGURE 3.

With the spool 30 moved to the bypass-shutoff position shown in FIGURE 3, the fluid thus drained from the left-hand portion of bore 15, and valve face 42 closing passage 44, fasteners 6 may be removed and housing portion 3 may be separated from head 2, for easy removal and cleaning or replacement of filter element 12.

Reassembly and return of the filter assembly of the invention to operating condition involves merely the reinsertion of housing portion 3 in recess 9, thus automatically engaging filter element 12 about boss 10 and a mere finger pressure on rod portion 38 inwardly of head 2 to return the parts to the position shown in FIGURE 4. Thereupon the fluid under pressure in inlet passage 17 will automatically pass into chamber A for filtering and thereafter outwardly through outlet passage 19 as above described.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

What is claimed is:

1. A filter assembly including a housing, a filter chamber removably secured to said housing, a housing inlet for fluid pressure, a chamber inlet for fluid pressure, a housing outlet for fluid pressure, a chamber outlet for fluid pressure, a filter element within the chamber intermediate the inlet and outlet, a spool valve slidable in said housing, passage means positioned in said spool valve to communicate said housing inlet with said chamber inlet and said housing outlet with said chamber outlet when said spool valve is in one position and to communicate said housing inlet and said housing outlet when said spool valve is in another position, said spool valve having portions closing said chamber inlet and outlet when in said other position.

2. The structure of claim 1 characterized by and including pilot valve means positioned to direct fluid from said housing inlet against said spool valve to move said spool valve to said other position in response to contamination in said filter chamber.

3. The structure of claim 2 wherein said pilot valve means is carried by said spool valve.

4. The structure of claim 3 wherein said pilot valve means includes a piston slidable within said spool valve in response to a predetermined pressure differential in at least some of said passage means in said spool valve.

5. The structure of claim 3 wherein said pilot valve means includes a valve passage communicating at one of its ends with the passage means in said spool valve which communicates said chamber inlet with said chamber inlet when said spool valve is in said one position, said valve passage communicating at the other of its ends with the area in said housing at one side of said spool valve.

6. The structure of claim 5 characterized by and including a discharge passage positioned in said spool valve to communicate said housing area with said filter chamber when said spool valve is in said other position.

7. The structure of claim 1 characterized by and including indicating means carried by said spool valve, one of said means extending from said housing when said spool valve is in said one position, another of said means extending from said housing when said spool valve is at said other position.

8. The structure of claim 1 characterized by and including drain outlet means in said housing, said spool valve closing said drain means when in said other position.

9. A filter assembly including a filter chamber, fluid pressure inlet and outlet passages communicating with said chamber, a filter element within the chamber intermediate said inlet and outlet passages, a spool valve mounted for movement into a position wherein portions of said spool valve close communication of said inlet and outlet passages with said chamber in response to contamination of said filter element within said chamber, said spool valve including a portion opening direct communication of said inlet and outlet portions when said spool valve is in said position.

10. The structure of claim 9 characterized by and including a control valve carried by said spool valve and subjected on opposite sides to fluid pressures entering said chamber and leaving said chamber.

11. The structure of claim 10 characterized by and including a branch passage in said spool valve communicating that side of said pilot valve normally subjected to fluid pressure leaving said chamber to the fluid pressure in said outlet passage when said spool valve is in said position.

12. In a filter assembly, a head, a filter housing removably secured to said head and defining a filter chamber, a filter element in said chamber, a fluid inlet in said head, a fluid outlet in said head, a bore extending across said inlet and outlet and communicating therewith, a first passage in said head communicating said bore with the area of said chamber outside said filter element, a second passage in said head communicating said bore with the area inside said filter element, a spool valve slidable in said bore, a first passage positioned in said spool valve to communicate said inlet with said first head passage when said spool valve is in one position in said bore, a second passage positioned in said spool valve to communicate said outlet with said second head passage when said spool valve is in said position, said spool valve having portions positioned to close said communication of said first and second passages when said spool valve is in another position, said spool valve having a portion positioned to open direct communication of said inlet with said outlet when said spool valve is in said other position, a control valve carried by said spool valve, a valve passage positioned in said spool valve to communicate one end of said bore with said first spool valve passage, yielding means positioned in said spool valve and engaging one side of said control valve to urge the same into a position closing said valve passage, said control valve being subjected to pressures in said first and second spool valve passages whereby a predetermined differential in said last-named pressures produces movement of said control valve against the action of said yielding means to open said valve passage and deliver fluid pressure to said one end of said bore to move said spool valve toward said other position, discharge means positioned in said spool valve to communicate said one end of said bore with said chamber when said spool valve is in said other position and a third passage positioned in said spool valve to communicate said outlet with the side of said control valve engaged by said yielding means.

13. A fluid pressure assembly including a housing, a bore in said housing, a first pair of passages communicating with said bore at circumferentially spaced points thereon, a second pair of passages communicating with said bore at circumferentially spaced points thereon and at positions longitudinally spaced from said first pair, a valve member freely slidable in said bore, a first lateral passage in said member, a second lateral passage in said member, said first lateral passage communicating said first pair of passages when said member is in one position, said second lateral passage communicating said second pair of passages when said member is in said one position, a control valve carried by said member and having a movable wall portion between said lateral passages and having its opposite sides subjected to pressures therein, a valve passage in said member communicating one of said lateral passages with one end of said bore, said control valve having a portion closing said valve passage when said control valve is in one position and opening said valve passage when said control valve is in another position, said member having portions closing communication between the passages of said first pair and said second pair and opening direct communication between one passage of said first pair and one passage of said second pair when said member is moved into another position in response to delivery of fluid pressure through said valve passage to one end of said bore.

References Cited
UNITED STATES PATENTS

| | | | |
|---|---|---|---|
| 2,748,947 | 6/1956 | Jay | 210—130 |
| 3,080,972 | 3/1963 | Smith | 210—133 X |
| 3,229,816 | 1/1966 | Rosaen | 210—130 |
| 3,283,098 | 11/1966 | Bair et al. | 210—133 |

REUBEN FRIEDMAN, *Primary Examiner.*

U.S. Cl. X.R.

116—70; 137—110; 210—133